(12) United States Patent
Dufinetz et al.

(10) Patent No.: US 8,778,114 B2
(45) Date of Patent: Jul. 15, 2014

(54) APPARATUS AND METHODS TO MANUFACTURE SHAPED COUNTER TOP EDGES FOR CUSTOM COUNTER TOPS

(71) Applicant: The Diller Corporation, Cincinnati, OH (US)

(72) Inventors: Matt Dufinetz, Fishers, IN (US); John Pehr, Ormond Beach, FL (US)

(73) Assignee: The Diller Corporation, Cincinnati, OH (US)

( * ) Notice: Subject to any disclaimer, the term of this patent is extended or adjusted under 35 U.S.C. 154(b) by 0 days.

(21) Appl. No.: 13/788,781

(22) Filed: Mar. 7, 2013

(65) Prior Publication Data

US 2013/0228269 A1 Sep. 5, 2013

Related U.S. Application Data

(63) Continuation-in-part of application No. 13/136,658, filed on Aug. 8, 2011, now Pat. No. 8,480,835.

(60) Provisional application No. 61/402,777, filed on Sep. 3, 2010.

(51) Int. Cl.
*B29C 65/00* (2006.01)

(52) U.S. Cl.
USPC ............ 156/228; 156/71; 156/196; 156/212; 156/213; 156/214; 156/215

(58) Field of Classification Search
CPC ........ B29C 53/04; B29C 53/80; B29C 33/20; B29C 33/26; B29C 33/302; B29C 65/7841; B29C 67/0011; B29C 2063/485; B29L 2031/441
USPC ............ 156/71, 196, 199–202, 212–216, 228
See application file for complete search history.

(56) References Cited

U.S. PATENT DOCUMENTS

| | | | | |
|---|---|---|---|---|
| 3,077,012 | A | * | 2/1963 | Speraw .................... 52/782.22 |
| 6,110,313 | A | * | 8/2000 | Ford ............................ 156/212 |
| 8,480,835 | B2 | * | 7/2013 | Pehr ............................ 156/228 |

* cited by examiner

*Primary Examiner* — Katarzyna Wyrozebski Lee
*Assistant Examiner* — Carson Gross
(74) *Attorney, Agent, or Firm* — Dinsmore & Shohl LLP

(57) ABSTRACT

A method of manufacturing a shaped counter top edge includes heating a sheet laminate to an elevated temperature, bending the sheet laminate to a formed laminate, and applying adhesive to at least one of the formed laminate or a substrate comprising a substrate upper face, a substrate lower face, and a substrate shaped edge positioned between the substrate upper face and the substrate lower face. The method also includes positioning the formed laminate proximate to the substrate upper face, the substrate lower face, and the substrate shaped edge, and clamping the formed laminate to the substrate upper face, the substrate lower face, and the substrate shaped edge of the substrate with a clamping press assembly until the adhesive cures to form a substrate/laminate assembly from the formed laminate and the substrate. The method further includes cutting a portion of the substrate/laminate assembly to form the shaped counter top edge.

25 Claims, 15 Drawing Sheets

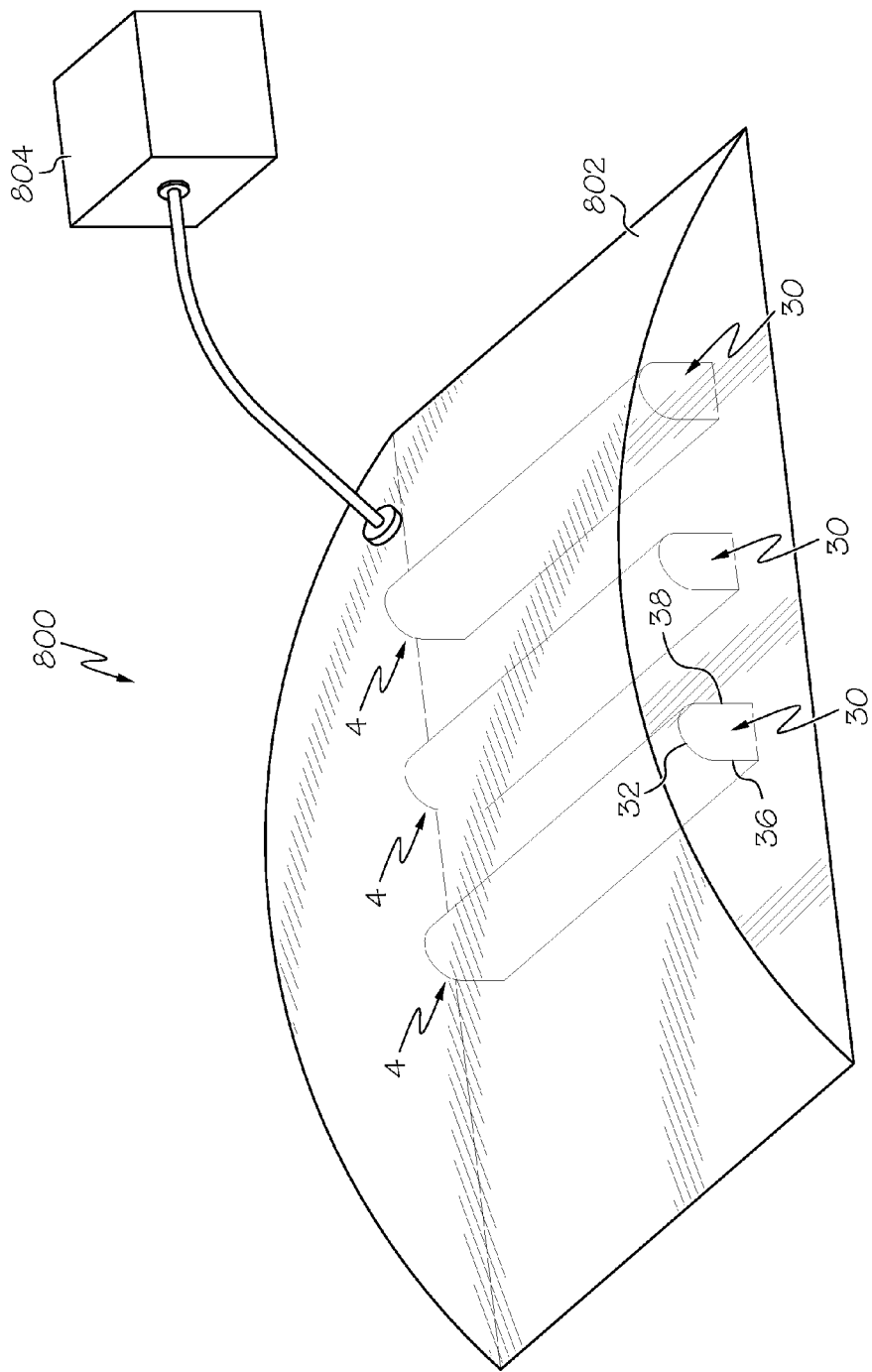

APPARATUS AND METHODS TO MANUFACTURE SHAPED COUNTER TOP EDGES FOR CUSTOM COUNTER TOPS

CROSS-REFERENCE TO RELATED APPLICATIONS

This application is a continuation-in-part application of U.S. patent application Ser. No. 13/136,658, filed Aug. 8, 2011, which claims the benefits of U.S. Provisional Patent Application Ser. No. 61/402,777, filed Sep. 3, 2010, the entire disclosures of which are incorporated herein by reference.

TECHNICAL FIELD

This present disclosure relates to counter tops, and in particular to an apparatus and method to manufacture shaped counter top edges for custom counter tops.

BACKGROUND

Laminate countertops are used in a variety of applications, including uses on home kitchen counters, bars, tables, bathrooms, workshops, gardening sheds, light manufacturing and the like.

An ongoing problem associated with sizing counter tops to a specific base is the difficulty in making neat and aesthetically pleasing corners, bump-outs, and cut-outs. Given the wide, formed counter tops on the market today, such turns are difficult to achieve while still maintaining a professional appearance in the finished countertop. This problem is especially acute in the case of custom-manufactured counter tops, which tend to incorporate more corners, bump-outs and cut-outs than would an off-the-shelf counter top. Thus it would be desirable to provide a counter top edge which could be easily glued to the front edge of a counter, and is readily angle-cut to follow counter top corners, bump-outs, and cut-outs.

Another problem associated with existing, mass-produced countertops is their height and width. The finished longitudinal countertop edge tends to feature a downwardly-extending lip intended to hang over the base front upper edge; the finishing veneer extends forwards across the countertop substrate upper surface (typically fiber board), and then curves downwards and backwards to meet the lip lower edge. This creates a thick, bulbous look to the countertop finished edge, which could be as much as a quarter inch thicker than the substrate itself. Thus it would be desirable to provide a counter top edge which is of the same thickness as the substrate itself.

Thus, it may be desirable to produce a countertop edge which is easily angle-cut to accommodate countertop edges, bump-outs, and cut-outs, and is the same thickness as the countertop to which it is to be adhered.

SUMMARY

According to one embodiment, a method of manufacturing a shaped counter top edge includes heating a sheet laminate to an elevated temperature, bending the sheet laminate to a formed laminate, and applying adhesive to at least one of the formed laminate or a substrate comprising a substrate upper face, a substrate lower face, and a substrate shaped edge positioned between the substrate upper face and the substrate lower face. The method also includes positioning the formed laminate proximate to the substrate upper face, the substrate lower face, and the substrate shaped edge, and clamping the formed laminate to the substrate upper face, the substrate lower face, and the substrate shaped edge of the substrate with a clamping press assembly until the adhesive cures to form a substrate/laminate assembly from the formed laminate and the substrate. The method further includes cutting a portion of the substrate/laminate assembly to form the shaped counter top edge.

According to another embodiment, a bonding press includes a clamping insert that extends in a longitudinal direction, the clamping insert having a bonding press mold groove, a backwall, a first sidewall transverse to the backwall, and a second sidewall transverse to the backwall. The bonding press also includes a reinforcement member having a web portion extending along the backwall of the clamping insert, a first flange portion extending from the web portion and proximate to the first sidewall of the clamping insert, and a second flange portion extending from the web portion and proximate to the second sidewall of the clamping insert.

According to yet another embodiment, a clamping press assembly for manufacturing a counter top edge comprising a laminate material coupled to a shaped surface of a substrate includes a bonding press and a bonding fixture. The bonding press includes a clamping insert having a bonding press mold groove, and a reinforcement member coupled to the clamping insert, the reinforcement member comprising a web portion, a first flange portion extending from the web portion, and a second flange portion extending from the web portion, where the first and second flange resist deformation of the clamping insert in a direction that tends to open the bonding press mold groove. The bonding fixture includes at least one force application member coupled to a support frame, where the force application member selectively applies a clamping force to the reinforcement member of the bonding press.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 24 schematically depicts a front perspective view of a clamping press apparatus according to one or more embodiments shown or described herein.

DETAILED DESCRIPTION

Figure 1:
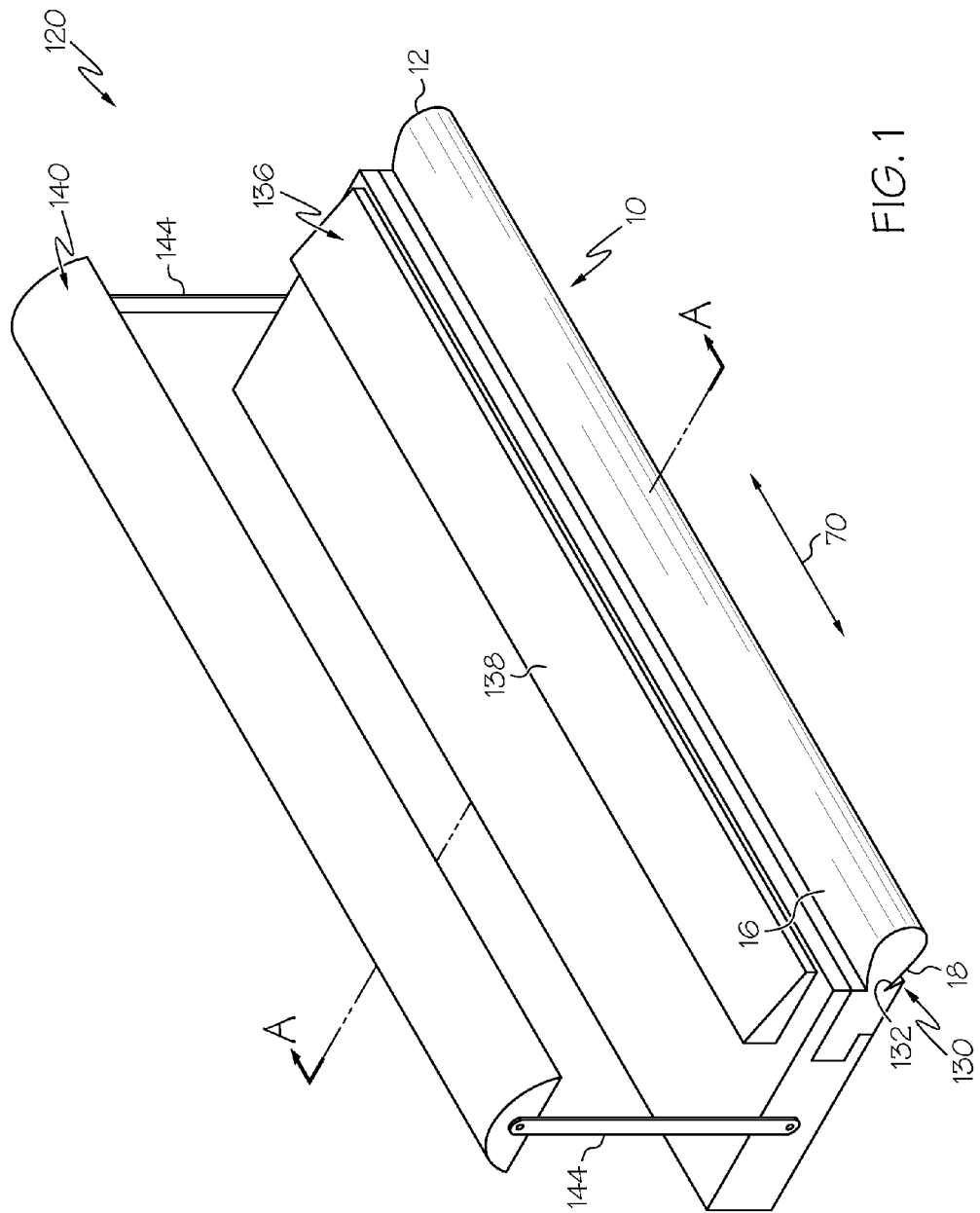
FIG. 1 schematically depicts a side perspective view of a post form molding machine according to one or more embodiments shown or described herein.

Apparatuses and methods of manufacturing shaped counter top edges for counter tops are disclosed herein. The shaped counter top edges allow custom counter tops to be fitted with a shaped edge that has an aesthetically-pleasing shape. In some embodiments, the counter top edge may be manufactured to include one of a variety of contours. The counter top edge may also be abutted against a planar top surface of a counter top to reduce the visible exposure of the underlying layers of the laminate material of the counter top.

Referring in general to FIGS. 1, 7, 11, and 18, the processed used in manufacturing counter top edges according to the present disclosure is schematically depicted. Laminate supplied in a spooled-roll form or in a generally planar form is introduced to a post form mold where the laminate is heated to an elevated temperature. The heated laminate is formed around a post form mold into a pre-formed shape that generally corresponds to the final shape of the counter top edge. Adhesive is applied to the pre-formed laminate and/or a substrate having a shaped surface. The laminate is positioned proximate to the substrate such that the pre-formed shape of the laminate is aligned with the shaped surface of the substrate. The laminate and the substrate are positioned in a clamping press assembly and clamping force is applied to the laminate and the substrate until the adhesive cures, thereby forming a substrate/laminate assembly that includes the laminate and the substrate. A portion of the substrate/laminate assembly that includes at least a portion of the shaped surface of the substrate is trimmed from the remaining substrate, which yields the counter top edge. Various embodiments of the methods of producing the counter top edges and apparatuses used in the methods of producing the counter top edges will be described in more detail herein.

The methods and apparatus described herein relate to manufacturing shaped counter top edges for custom counter tops comprises three principal steps: first, forming a sheet laminate 2 into a formed laminate 4; second, adhering the formed laminate 4 to a substrate 30 thereby producing a substrate/laminate assembly 40; and third, cutting counter top edges 90 from the substrate/laminate assembly 40.

Referring in detail to FIG. 1, a post form molding machine 120 used in the counter top edge manufacturing process is depicted. The post form molding machine 120 includes a post form mold 10 having a post form mold shaping face 12, a substantially planar post form mold upper face 16 that is tangent to the post form mold shaping face 12, and a substantially planar post form mold lower face 18 that is tangent to the post form mold shaping face 12. In the depicted embodiment, the post form mold upper face 16 is positioned transverse to the post form mold lower face 18 of the post form mold 10. However, in other embodiments, the post form mold upper face 16 may be substantially parallel to the post form mold lower face 18 of the post form mold 10. The post form molds 10 may be removable and replaceable from the post form molding machine 120.

The post form mold 10 also includes a lower lip 130 that extends in a longitudinal direction 70 along the post form mold 10 and is spaced apart from the post form mold lower face 18. The lower lip 130 defines one wall of a post form mold slot 132. The post form mold lower face 18 defines a second wall of the post form mold slot 132. The post form mold slot 132 is sized to accept sheet laminate 2 along the length of the post form mold 10, as depicted in FIG. 3.

Figure 2:
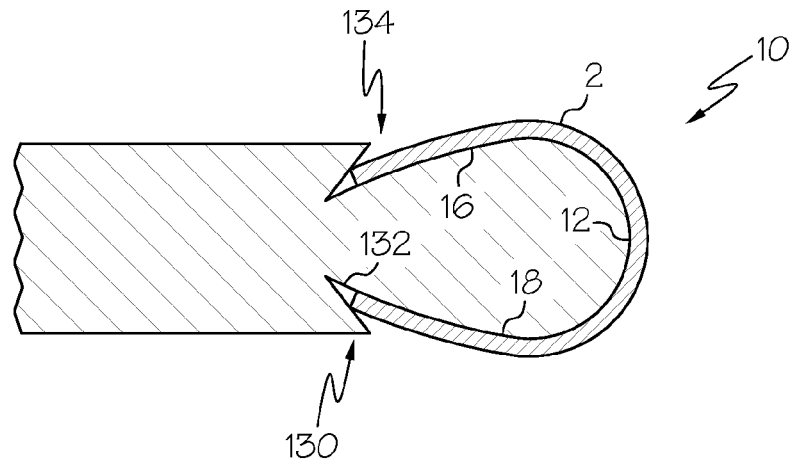
FIG. 2 schematically depicts a side view of a post form mold and a sheet laminate according to one or more embodiments shown or described herein.

Referring to FIG. 2, the post form mold 10 may also include an upper lip 134 that is positioned proximate to the post form mold upper face 16 of the post form mold 10 and extends in the longitudinal direction 70 along the post form mold 10. The sheet laminate 2 may be positioned within the upper lip 134 when the sheet laminate 2 is engaged with the post form mold upper face 16 of the post form mold 10, as depicted in FIG. 3.

Figure 3:
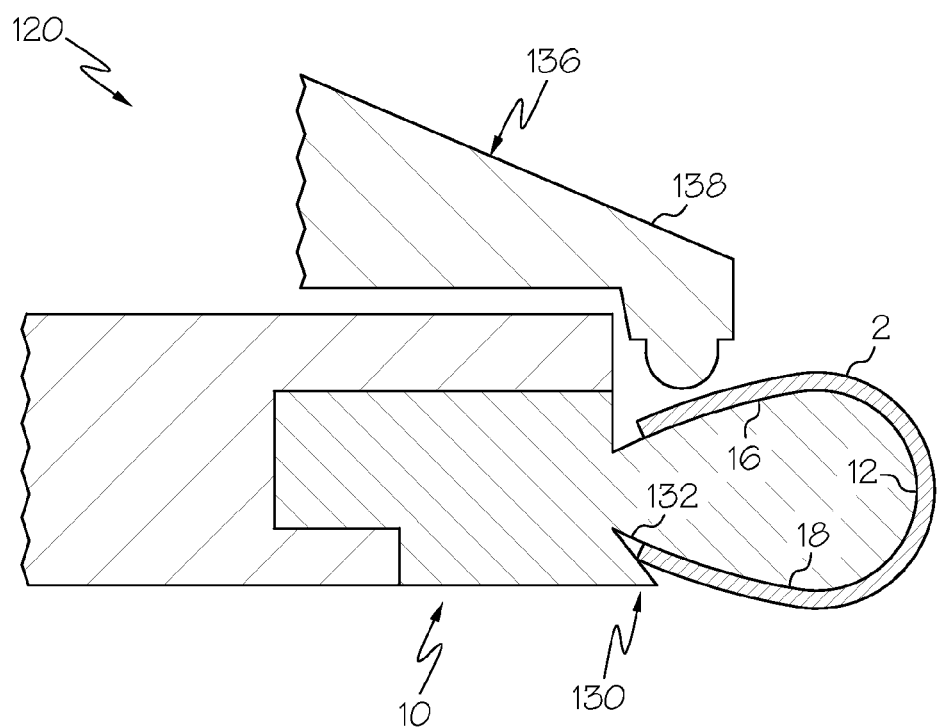
FIG. 3 schematically depicts a side cross-sectional view of the post form molding machine of FIG. 1 shown along line A-A.

Referring to FIG. 3, the post form molding machine 120 also includes a retention member 136 that selectively retains the sheet laminate 2 proximate to the post form mold 10. The retention member 136 may be operated by a user to grip or release the sheet laminate 2, thereby limiting movement of the sheet laminate 2 relative to the post form mold 10. In some embodiments, the retention member 136 may include a plurality of threaded fasteners (not shown) that are extended along the post form molding machine 120 to engage the sheet laminate 2 with the post form mold 10. In other embodiments, the retention member 136 includes a brake 138 that an operator may selectively move between closed and open positions to engage and disengage, respectively, the sheet laminate 2 and the post form mold 10.

Figure 4:
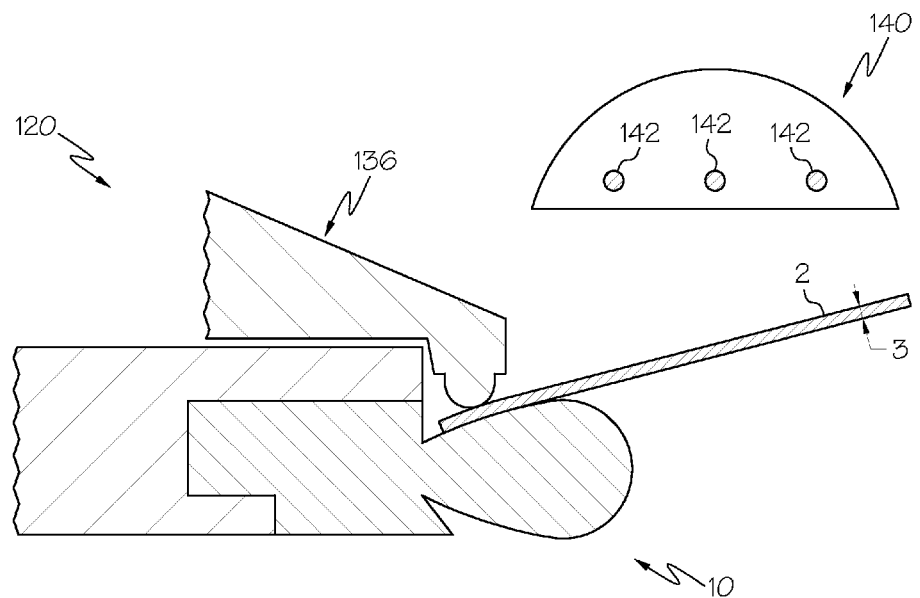
FIG. 4 schematically depicts a side cross-sectional view of the post form molding machine of FIG. 1 shown along line A-A.

The post form molding machine 120 may also include a heater 140 that is adapted to heat the sheet laminate 2, when positioned proximate to the post form mold 10, as depicted in FIG. 4. The heater may include a plurality of heating elements 142. In one embodiment, the heating elements 142 are resistive heater elements made from, for example and not limitation, ferrous alloys, nickel alloys, or ceramics. The heater 140 may include a retraction assembly 144 (as depicted in FIG. 1) that allows the heating elements 142 to be selectively repositioned closer to or further from the sheet laminate 2.

In some embodiments, portions of the post form mold 10 may be actively heated, for example, by embedded heating coils (not shown) positioned inside of the post form mold 10. In other embodiments, portions of the post form mold 10 may be actively cooled, for example, by fluidic channels (not shown) that pass through the post form mold 10 that allow fluid to pass through the post form mold 10 and transfer heat away from the surfaces of the post form mold 10.

Suitable post form molding machines for performing the methods according to the present disclosure include commercial available or modified Model 0110 Post Former available from Evans Machinery, Inc.

During the forming process, heat is applied to sheet laminate 2 to reduce the stiffness of the sheet laminate 2. The sheet laminate 2 is clamped into intimate contact with the post form mold shaping face 12, the post form mold upper face 16, and the post form mold lower face 18 of the post form mold 10. Heating of the sheet laminate 2 reduces the stiffness of the sheet laminate 2 such that the sheet laminate 2 exhibits increased compliance to forces applied to the sheet laminate 2. When heated to an elevated temperature, the sheet laminate 2 may be deformed with minimal application of force. An operator may manually deform the sheet laminate 2 such that the sheet laminate 2 may be brought into contact with the post form mold upper face 16, the post form mold shaping face 12, and the post form mold lower face 18, as depicted in FIGS. 2 and 3. The sheet laminate 2 remains in contact with the post form mold 10 as the sheet laminate 2 cools, thereby imparting a modified shape to the sheet laminate 2.

The heating time and temperature of the sheet laminate 2 may vary based on the thickness 3 of the sheet laminate 2 and the type of sheet laminate 2 used. Examples of laminates suitable for the process described herein include laminate having a thickness in a range from about 0.0039 inches to about 0.049 inches commercially available under the names Formica™, Nevamar™, Wilsonar™, and the like. Further, the clamping time that the sheet laminate 2 is secured in intimate contact with the post form mold 10 of the post form molding machine 120 may vary. In one example, one commonly-used laminate is heated from about 300 degrees Fahrenheit to about 350 degrees Fahrenheit for a time period from about 10 to about 30 seconds. With the laminate at an elevated temperature, the sheet laminate 2 is clamped onto the post form mold 10 of the post form molding machine 120 for a time period from about 10 to about 30 seconds. During the clamping time, the temperature of the sheet laminate decreases such that the stiffness of the laminate increases. A formed laminate 4 removed from the post form mold 10, therefore, will retain a memory of the shape of the post form mold 10 after the formed laminate 4 is removed from the post form mold. It should be understood that the times and temperatures of operations may vary depending on the particular laminate material used and the laminate thickness.

Referring again to FIG. 3-4, an operator may first secure a portion of the sheet laminate 2 to the post form mold 10, for example by positioning a portion of the sheet laminate 2 proximate to the post form mold upper face 16 of the post form mold 10, and securing the sheet laminate 2 to the post form mold 10 with the retention member 136. With a portion of the sheet laminate 2 secured to the post form mold 10, the heater 140 is moved to a position proximate to the sheet laminate 2. The heater 140 remains positioned proximate to the sheet laminate 2 until the temperature of the sheet laminate 2 has increased to a pre-determined temperature and/or for a pre-determined time that corresponds to a decrease in stiffness of the sheet laminate 2.

With the sheet laminate 2 heated to an elevated temperature, the user may reposition the heater 140 to a position that is spaced apart from the sheet laminate 2. The user may then manually deform the sheet laminate 2 such that the sheet laminate 2 generally conforms to the shape of the post form mold 10. The user may then position the sheet laminate 2 proximate to the post form mold 10 and secure the sheet laminate 2 to the post form mold 10 such that the sheet laminate 2 is in intimate contact with the post form mold 10 such that the sheet laminate 2 substantially conforms to the shape of the post form mold 10. With the heater 140 positioned away from the sheet laminate 2, the sheet laminate 2 is allowed to cool from the elevated temperature. As the sheet laminate 2 cools, the stiffness of the sheet laminate 2 increases. Because the sheet laminate 2 is held in intimate contact with the post form mold 10 as the sheet laminate 2 cools, the sheet laminate 2 will be shaped into a formed laminate 4 after cooling and removal from the post form mold 10.

Figure 5:
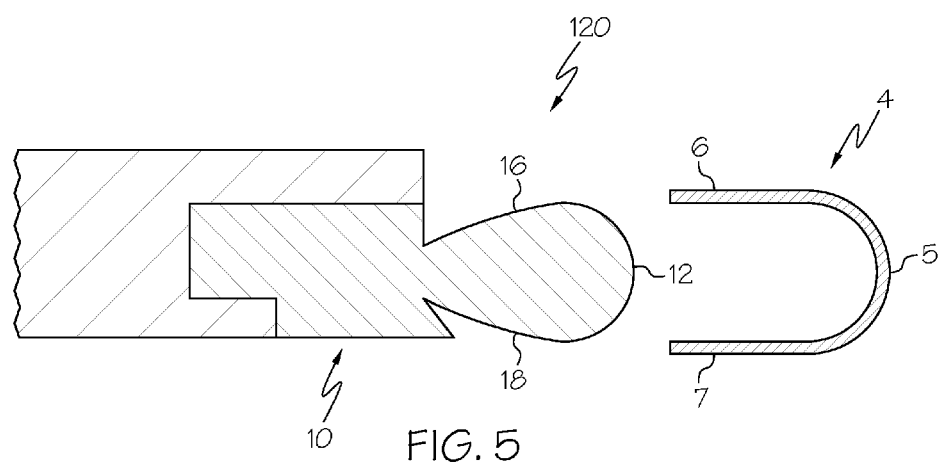
FIG. 5 schematically depicts a side cross-sectional view of the post form molding machine of FIG. 1 shown along line A-A with a formed laminate removed from the post form mold.

The formed laminate 4 exhibits a modified shaping having dimensional characteristics that reflect the post form mold 10 on which the formed laminate 4 was formed. In the embodiment depicted in FIG. 5, the formed laminate 4 includes a formed laminate upper leg 6 that corresponds to the post form mold upper face 16 of the post form mold 10, a formed laminate lower leg 7 that corresponds to the post form mold lower face 18 of the post form mold 10, and a formed laminate spine 5 positioned between the formed laminate upper leg 6 and the formed laminate lower leg 7. The formed laminate spine 5 corresponds to the post form mold shaping face 12 of the post form mold 10. The formed laminate spine 5 of the formed laminate 4 is generally tangential to both the formed laminate upper leg 6 and the formed laminate lower leg 7 of the formed laminate 4.

The shape of the formed laminate 4 may differ from the shape of the post form mold 10. Some of the difference in shape may be attributed to the material memory of the laminate material. In the embodiment depicted in FIG. 5, the post form mold upper face 16 and the post form mold lower face 18 of the post form mold 10 are transverse to one another and positioned at an acute angle relative to one another. In the depicted embodiment, the post form mold upper face 16 and the post form mold lower face 18 are positioned at an angle in a range from about 20 degrees to about 40 degrees relative to one another. The formed laminate 4 produced by the post form mold 10 includes the formed laminate upper leg 6 and the formed laminate lower leg 7 that are spaced apart from the post form mold 10 such that the formed laminate upper leg 6 and the formed laminate lower leg 7 are substantially parallel with one another. The formed laminate 4 may "spring back" from the post form mold 10 from which the formed laminate 4 is produced.

Figure 6:
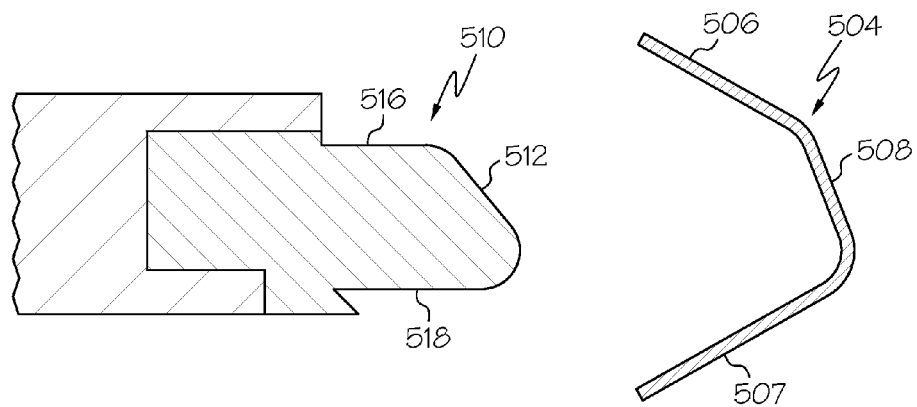
FIG. 6 schematically depicts a cross-sectional side view of a post form molding machine with a formed laminate removed from the post form mold according to one or more embodiments shown or described herein.

Another embodiment of the post form mold 510 and the corresponding formed laminate 504 is depicted in FIG. 6. In this embodiment, the post form mold 510 includes an "ogee" shape. Similar to the embodiment described above, the post form mold 510 includes a post form mold upper face 516, a post form mold lower face 518, and a post form mold force shaping face 512 positioned between the post form mold upper face 516 and the post form mold lower face 518. In the embodiment depicted in FIG. 5, the post form mold upper face 516 and the post form mold lower face 518 are substantially parallel with one another. When the sheet laminate is held in intimate contact with the post form mold 510, the sheet laminate maintains the shape of the post form mold 510, thereby forming the formed laminate 504. When the formed laminate 504 is removed from the post form mold 510, the formed laminate 504 includes a formed laminate upper leg 506 that corresponds to the post form mold upper face 516, a formed laminate lower leg 507 that corresponds to the post mold form lower face 518, and a formed laminate spine 505 that corresponds to the post form mold shaping face 512. However, because of the material memory of the laminate, the formed laminate 504 may spring back away from the shape of the post form mold 510 such that the formed laminate upper leg 506 and the formed laminate lower leg 507 of the formed laminate 504 are not parallel with one another.

While particular shapes of the post form molds 10, 510 and the corresponding formed laminates 4, 504 produced from the post form molds 10, 510 are depicted, it should be understood that various shapes of post form molds and corresponding formed laminates may be constructed without departing from the scope of the present disclosure.

Figure 7:
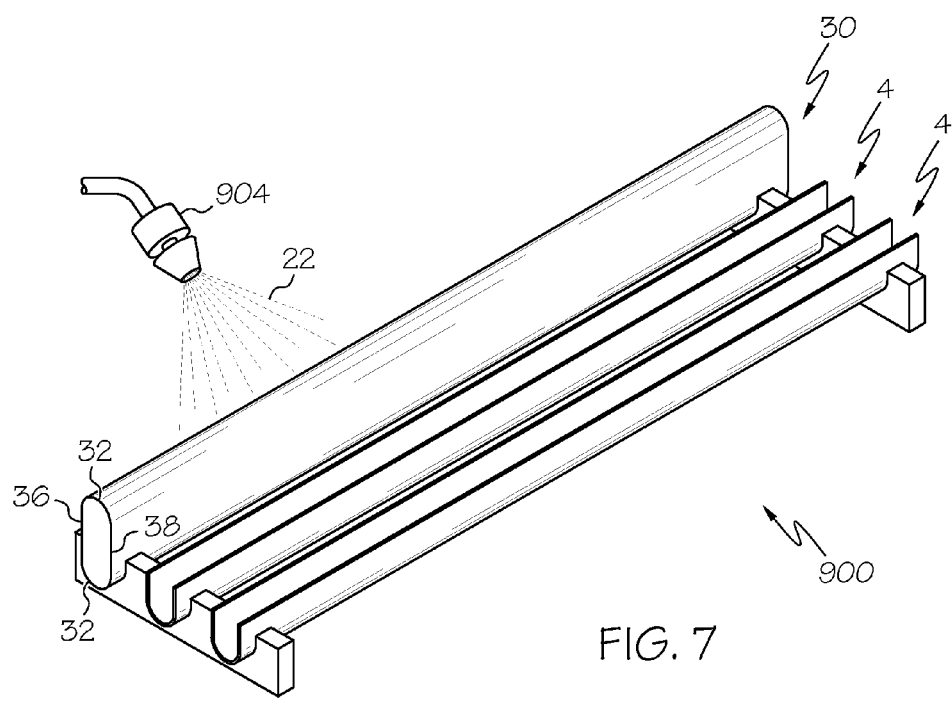
FIG. 7 schematically depicts a side perspective view of an adhesive application station according to one or more embodiments shown or described herein.

Referring now to FIG. 7, the formed laminate 4 and/or a substrate 30 to which the formed laminate 4 will be affixed are introduced to an adhesive application station 900. The substrate 30 supports the formed laminate 4 during assembly and use of the finished laminate edge, as will be described below in further detail. The substrate 30 include a substrate upper face 36, a substrate lower face 38, and a substrate shaped edge 32 positioned between the substrate upper face 36 and the substrate lower face 38. The substrate 30 and the formed laminate 4 include corresponding first and substrate lower faces and substrate shaped edges, such that the formed laminate 4 may be readily secured to the substrate 30. In the embodiment depicted in FIG. 6, the substrate 30 includes a first substrate shaped edge 32 positioned along one side of the substrate 30 and a second substrate shaped edge 32 positioned along a second side of the substrate 30 opposite the first substrate shaped edge 32. Incorporation of the first substrate shaped edge 32 and the second substrate shaped edge 32 allow two formed laminates 4 to be secured to the substrate 30 simultaneously.

The adhesive application station 900 allows application of an adhesive 22 to at least one of the formed laminate 4 or the substrate 30. The adhesive 22 may be selected from a variety of commercially available adhesives including drying adhesives, pressure sensitive adhesives, contact adhesives, hot adhesives, reactive adhesives and the like. In some embodiments, the adhesives 22 may include polyester resin, polyurethane resin, acrylic resins, or epoxy resins. The adhesives 22 may be applied as a liquid at least one of the formed laminate 4 or the substrate 30. In some embodiments, the adhesive 22 is delivered from adhesive nozzles 904, which meter the delivery rate of the adhesive 22 to the formed laminate 4 and/or the substrate 30.

Figure 8:
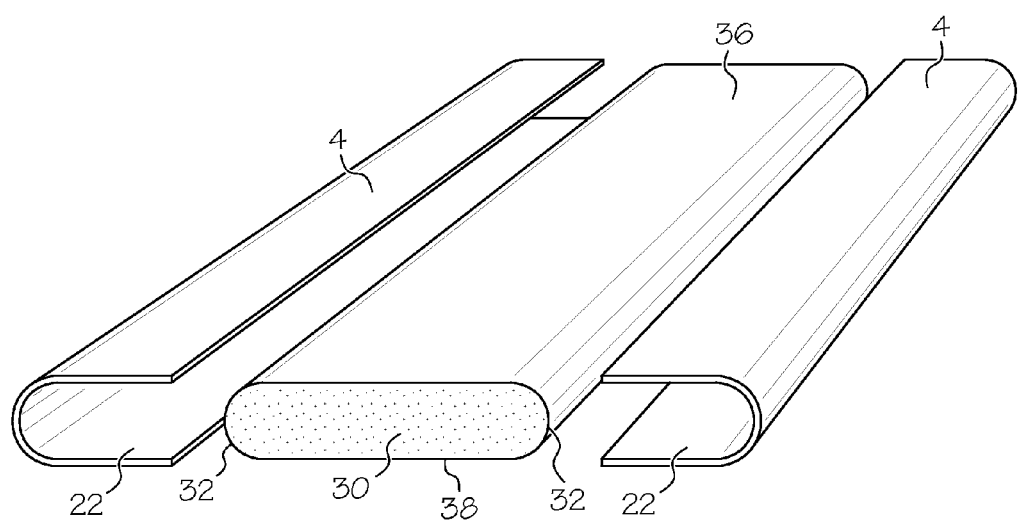
FIG. 8 schematically depicts a side perspective view of an assembly operation of formed laminates onto a substrate according to one or more embodiments shown or described herein.
Figure 9:
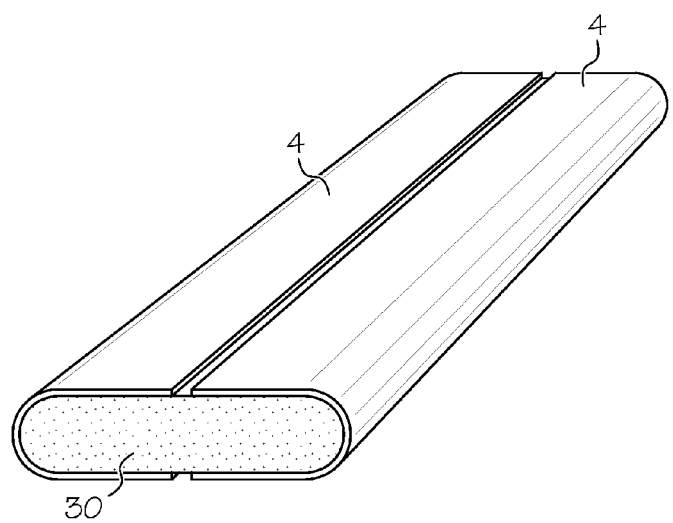
FIG. 9 schematically depicts a side perspective view of an assembly operation of formed laminates onto a substrate according to one or more embodiments shown or described herein.

Referring to FIGS. 8 and 9, following application of the adhesive 22, the formed laminate 4 and the substrate 30 are mated with one another such that the corresponding first and substrate lower faces and substrate shaped edges of the formed laminate 4 and the substrate 30 are positioned proximate to one another.

Figure 10:
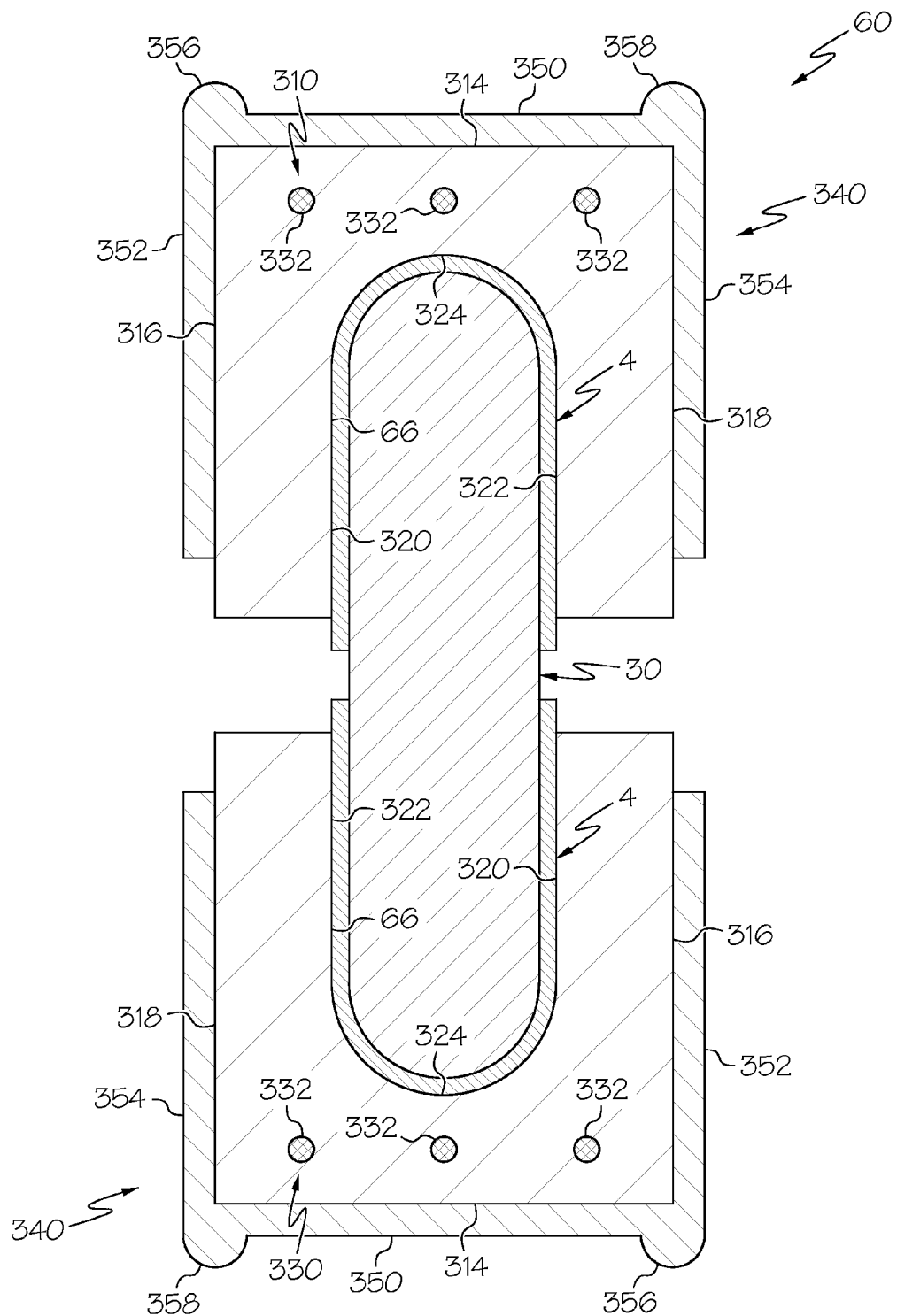
FIG. 10 schematically depicts a side cross-sectional view of a bonding press according to one or more embodiments shown or described herein.

Referring now to FIG. 10, the formed laminate 4 and the substrate 30 are positioned within a clamping insert 310 of a bonding press 60. The clamping insert 310 extends in the longitudinal direction 70 corresponding to the length of the substrate 30 and the formed laminate 4. The clamping insert 310 includes a bonding press mold groove 66, a backwall 314, a first sidewall 316 transverse to the backwall 314, and a second sidewall 318 transverse to the backwall 314. The bonding press mold groove 66 extends along the clamping insert 310, and has a shape generally corresponding to the substrate 30 and the formed laminate 4. The bonding press mold groove 66 of the embodiment depicted in FIG. 10 includes a first planar portion 320, a second planar portion 322, and a shaped edge 324 positioned between the first planar portion 320 and the second planar portion 322. The shaped edge 324 is tangential to both the first planar portion 320 and the second planar portion 322.

The clamping insert 310 may be made from a variety of materials including, for example and without limitation, metals or plastics. In some embodiments, the clamping insert 310 may include resins such as polyoxymethylene, acrylics, polyurethanes, polyesters, polycarbonates, nylons, and the like. In certain embodiments, the clamping insert 310 may be periodically coated with a mold release compound to reduce the likelihood of the formed laminate 4 bonding to the bonding press mold groove 66 of the clamping insert 310.

In some embodiments, the clamping insert 310 may also include a heat transfer element 330. The heat transfer element 330 may include a resistive heating element. The heat transfer element 330 may also include a fluidic channel 332 that passes through at least portions of the clamping insert 310, thereby allowing fluid to be conveyed through the clamping insert 310. In some embodiments, the adhesive used to couple the formed laminate 4 to the substrate 30 may have a decreased cure time when the adhesive is cured at an elevated temperatures. Examples of such adhesives include reactive adhesives whose components chemically react. Cycle time associated with the curing operation may be reduced upon introduction of heat to the bonding press 60.

The bonding press 60 also includes a reinforcement member 340 that at least partially surrounds the clamping insert 310. The reinforcement member 340 includes a web portion 350 that is positioned proximate to the backwall 314 of the clamping insert 310 and extends in the longitudinal direction 70. The reinforcement member also includes a first flange portion 352 extending transverse to the web portion 350 and a second flange portion 354 extending transverse to the web portion 350. The first flange portion 352 may be positioned proximate to the first sidewall 316 of the clamping insert 310 and the second flange portion 354 may be positioned proximate to the second sidewall 318 of the clamping insert 310.

The reinforcement member 340 may further include a first contact rib 356 that is positioned along the web portion 350 at a position proximate to the first flange portion 352 and a second contact rib 358 positioned along the web portion 350 at a position proximate to the second flange portion 354. The first contact rib 356 and the second contact rib 358 extend a spacing distance away from the web portion 350. The reinforcement member 340 may be made from a variety of materials including, for example and without limitation, aluminum or steel alloys.

The first flange portion 352 and the second flange portion 354 of the reinforcement member 340 may be in intimate contact with the first sidewall 316 and the second sidewall 318, respectively, of the clamping insert 310. The first flange portion 352 and the second flange portion 354 of the reinforcement member 340 may, therefore, limit flexing of the clamping insert 310 in a direction that tends to "open" the bonding press mold groove 66. For example, forces applied normal to the first planar portion 320 and the second planar portion 322 of the bonding press mold groove 66 by the substrate 30 and/or the formed laminate 4 may tend to apply a force that separates the first planar portion 320 from the second planar portion 322. By maintaining intimate contact between the first flange portion 352 and the second flange portion 354 with the first sidewall 316 and the second sidewall 318, the reinforcement member 340 may reduce flexing of the clamping insert 310.

Figure 11:
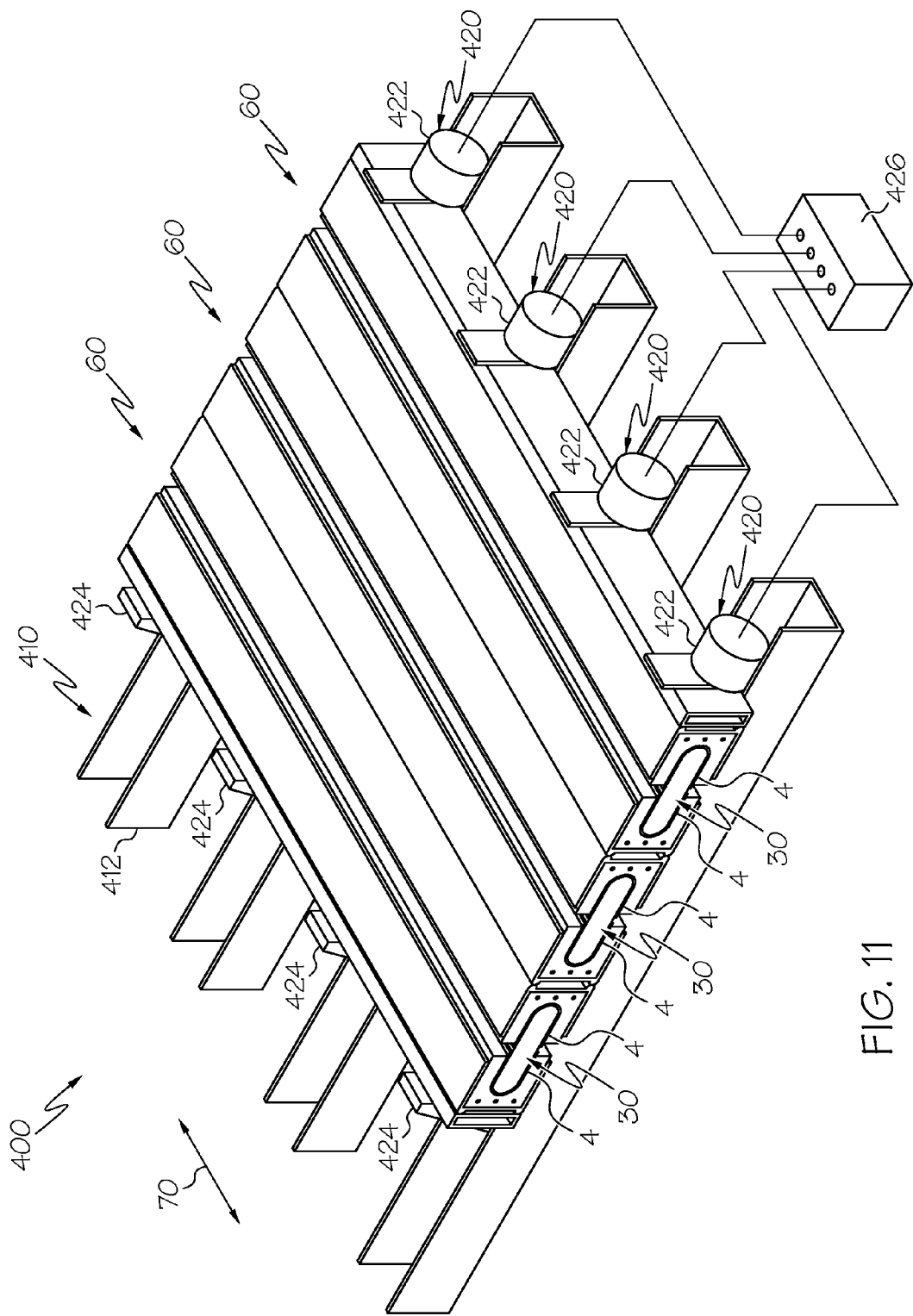
FIG. 11 schematically depicts a side perspective view of a clamping press apparatus according to one or more embodiments shown or described herein.

Referring now to FIG. 11, the bonding press 60, the substrate 30, and the formed laminate 4 positioned proximate to the bonding press mold groove 66 of the clamping insert 310 are positioned within a bonding fixture 410, thereby defining a clamping press apparatus 400. The bonding fixture 410 includes at least one force application member 420 coupled to a support frame 412. In the depicted embodiment, the bonding fixture 410 includes a plurality of force application members 420 positioned at a plurality of locations in the longitudinal direction 70 along the support frame 412. The force application members 420 are adapted to extend and retract, thereby applying a force to bonding press 60, and the substrate 30 and the formed laminate 4 positioned within the bonding press 60.

In one embodiment (not shown), the force application member 420 may include a threaded clamp that a user extends and contracts relative to a tailstock 424 that is positioned distally from the force application member 420, and opposite the bonding press 60 from the force application member 420. In the depicted embodiment, the force application member 420 includes a hydraulic clamp 422 having a piston that extends and retracts relative to the tailstock 424. The hydraulic clamp 422 is in fluid communication with a hydraulic pressure source 426 that maintains fluid at an elevated pressure. The hydraulic clamp 422 allows for remote and/or autonomous management of the force applied to the bonding press 60. Maintaining force between the formed laminate 4 and the substrate 30 while the adhesive cures may ensure good adhesion between the formed laminate 4 and the substrate upper face 36, the substrate lower face 38, and the substrate shaped edge 32 of the substrate 30.

Figure 12:
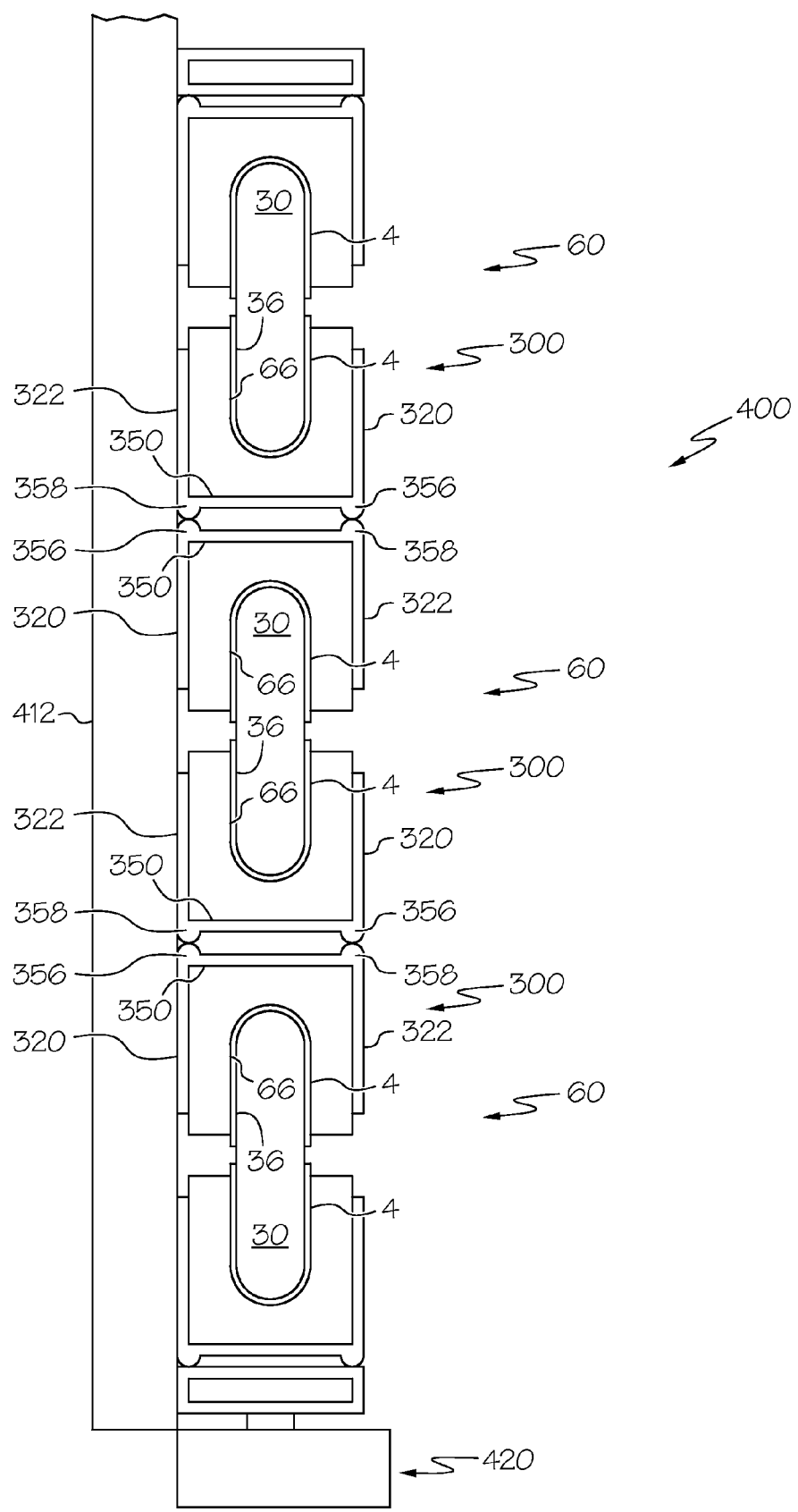
FIG. 12 schematically depicts a side view of a clamping press apparatus according to one or more embodiments shown or described herein.

Referring now to FIG. 12, the substrate 30 and the formed laminate 4 are held in intimate contact with the adhesive by the force supplied by the clamping press apparatus 400. In the embodiment depicted in FIG. 12, a plurality of bonding presses 60 are loaded onto the support frame 412. The plurality of bonding presses 60 are arranged such that the web portions 350 of adjacent bonding press 60 are positioned proximate to one another. In the embodiment depicted in FIG. 12, the bonding presses 60 are arranged such that the first and second contact ribs 356, 358 of adjacent reinforcement members 340 contact one another. When force is applied to the plurality of bonding presses 300 by the force application member 420, the first and second contact ribs 356, 358 of adjacent bonding presses 60 contact one another, thereby transferring clamping force to the substrate 30 and the formed laminate 4, as well as the other bonding press 60 positioned along the support frame 412. Because the first and second contact ribs 356, 358 are offset laterally from the first planar portion 320, the second planar portion 322, and the shaped edge 324 of the clamping insert 310, the force applied by the first and second contact ribs 356, 358 by the force application member 420 tends to "close" the bonding press mold groove 66 in a direction that tends to deflect the first planar portion 320 towards the second planar portion 322. Because force is applied to the clamping insert 310 that tends to deflect the first planar portion 320 and the second planar portion 322 towards one another, the first planar portion 320 and the second planar portion 322 apply force to the substrate upper face 36 and the substrate lower face 38 of the substrate 30 that includes a force vector normal to the substrate upper face 36 and to the substrate lower face 38, as well as to the substrate shaped edge 32. Application of force to the formed laminate 4 in a direction that maintains contact with the substrate upper face 36 and the substrate lower face 38 of the substrate 30 may ensure good adhesion and high part quality.

Force is maintained by the force application members 420 on the bonding presses 60 until a pre-determined time has elapsed selected such that adhesive between the substrate 30 and the formed laminate 4 has an opportunity to at least partially cure. In some embodiments, force is maintained by the force application members 420 on the bonding presses 60 until the adhesive between the substrate 30 and the formed laminate 4 has fully cured. Upon the withdrawal of force by the force application members 420, the substrate 30 and the formed laminate 4 are coupled to one another, thereby forming a substrate/laminate assembly 40. The substrate/laminate assemblies 40 are removed from the bonding presses 60, and are moved to additional processing stations such that further manufacturing operations to be completed on the substrate/laminate assembly 40.

Figure 13:
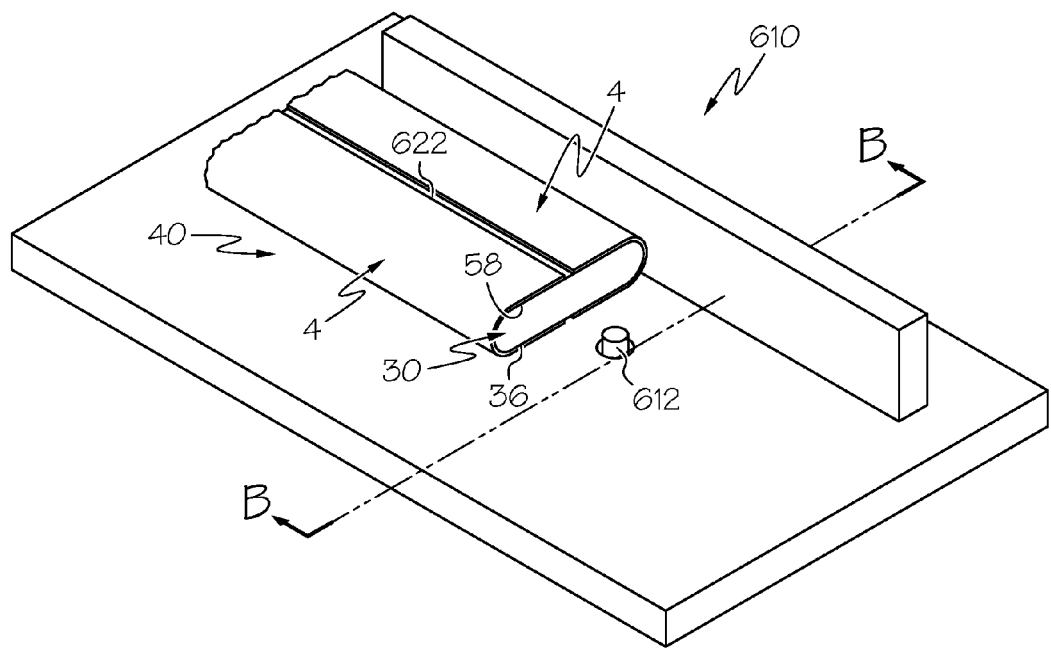
FIG. 13 schematically depicts a front perspective view of an intermediate trimming station according to one or more embodiments shown or described herein.
Figure 14:
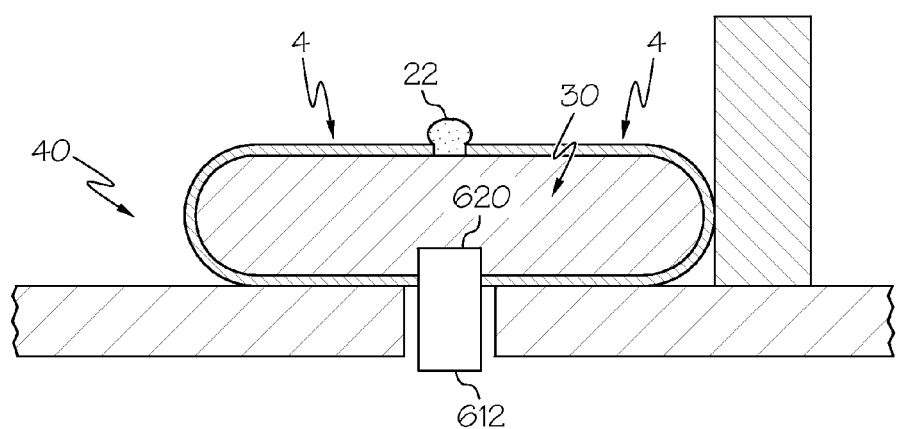
FIG. 14 schematically depicts a front cross-sectional view of the intermediate trimming station of FIG. 13 shown along line B-B.

Referring now to FIGS. 13-14, an intermediate trimming station 610 is depicted. The intermediate trimming station 610 includes a material removal tool 612, for example a router, a table saw, or a scraper, that removes excess adhesive 22 that was pushed out from between the formed laminate 4 and the substrate 30 during the cure process. Removal of excess adhesive may improve processing of the substrate/laminate assembly 40 in subsequent operations. In the depicted embodiment, the material removal tool 612 is a router having a bit that is positioned to remove excess adhesive, as well as portions of the formed laminate 4 and the substrate 30, and thereby form a first relief channel 620. Because the regions of the laminate perform 92 and the substrate 30 proximate to the first relief channel 620 that are removed in the intermediate trimming station 610 are discarded in subsequent operations, removal of portions of the formed laminate 4 and the substrate 30 do not affect the final part. In the depicted embodiment, the substrate/laminate assembly 40 passes through the intermediate trimming station 610 twice such that the first relief channel 620 and a second relief channel 622 formed into opposite sides of the substrate/laminate assembly 40 (i.e., sides corresponding to the substrate upper face 36 and the substrate lower face 38) are incorporated into the substrate/laminate assembly 40 to remove excess adhesive.

Referring now to FIG. 15-19, the substrate/laminate assembly 40 is processed through a cutting station 700 that separates the substrate/laminate assembly 40 into counter top edges 90 and scrap 62. The cutting station 700 may include a table saw, a circular saw, a cutting wheel, and the like. In one embodiment (not shown), the substrate/laminate assembly 40 is introduced to the cutting station 700, which separations the substrate/laminate assembly 40 into the counter top edges 90 and scrap 62 in a single cutting operation. In the embodiment depicted in FIGS. 15-19, the substrate/laminate assembly 40 is separated into counter top edges 90 and scrap 62 in a two-step cutting operation.

Figure 15:
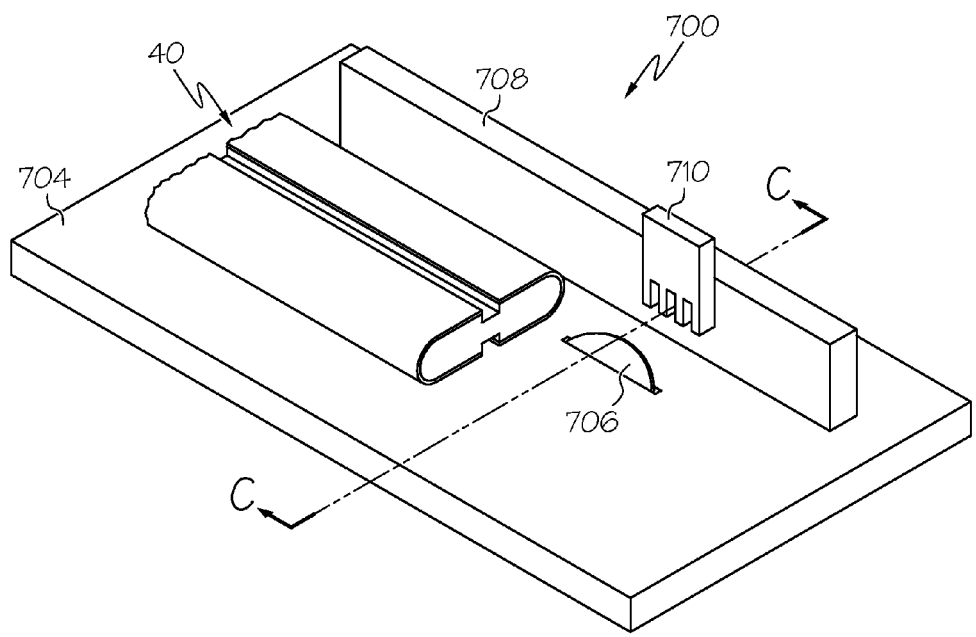
FIG. 15 schematically depicts a front perspective view of a cutting station according to one or more embodiments shown or described herein.
Figure 16:
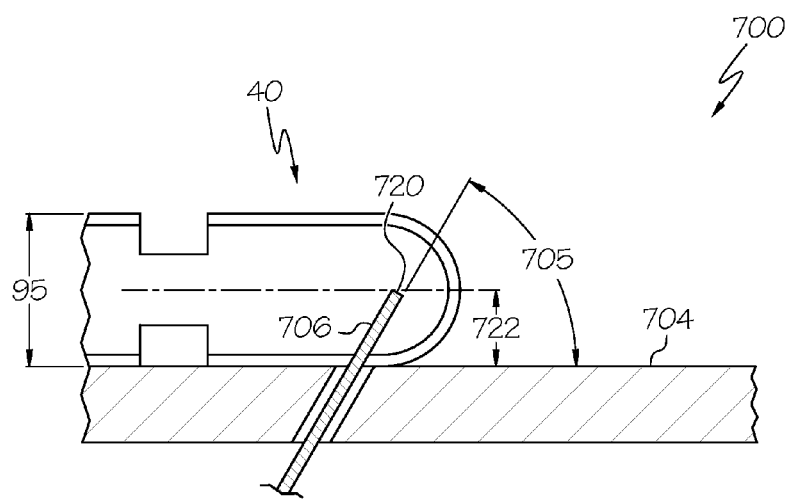
FIG. 16 schematically depicts a front cross-sectional view of the cutting station of FIG. 15 shown along line C-C.

Referring to FIG. 15, the substrate/laminate assembly 40 is first introduced to the cutting station 700 that includes a table saw 702 having a table 704, a blade 706 extending through an opening in the table 704, and a fence 708 positioned transverse to the table 704 and spaced apart from the blade 706. The cutting station depicted in FIG. 15 also includes a featherboard 710 having a plurality of fingers that extend towards the table 704. In the embodiment depicted in FIGS. 15-16, the blade 706 is positioned transverse to the table 704 and is biased at a non-orthogonal angle to the table 704. In the depicted embodiment, the blade 706 is positioned at an angle 705 relative to the table 704 in a range from about 85.5 degrees to about 89.5 degrees. The substrate/laminate assembly 40 is positioned to contact the table 704 and the fence 708, and the substrate/laminate assembly 40 is directed towards the blade 706. The blade 706 cuts a first channel 720 into the substrate/laminate assembly 40. The first channel 720 extends a distance 722 in the thickness direction of the substrate/laminate assembly 40 that is less than the thickness 95 of the substrate/laminate assembly 40, and at an angle relative to the planar surfaces of the substrate/laminate assembly 40 that is in a range from about 85.5 degrees to about 89.5 degrees.

Figure 17:
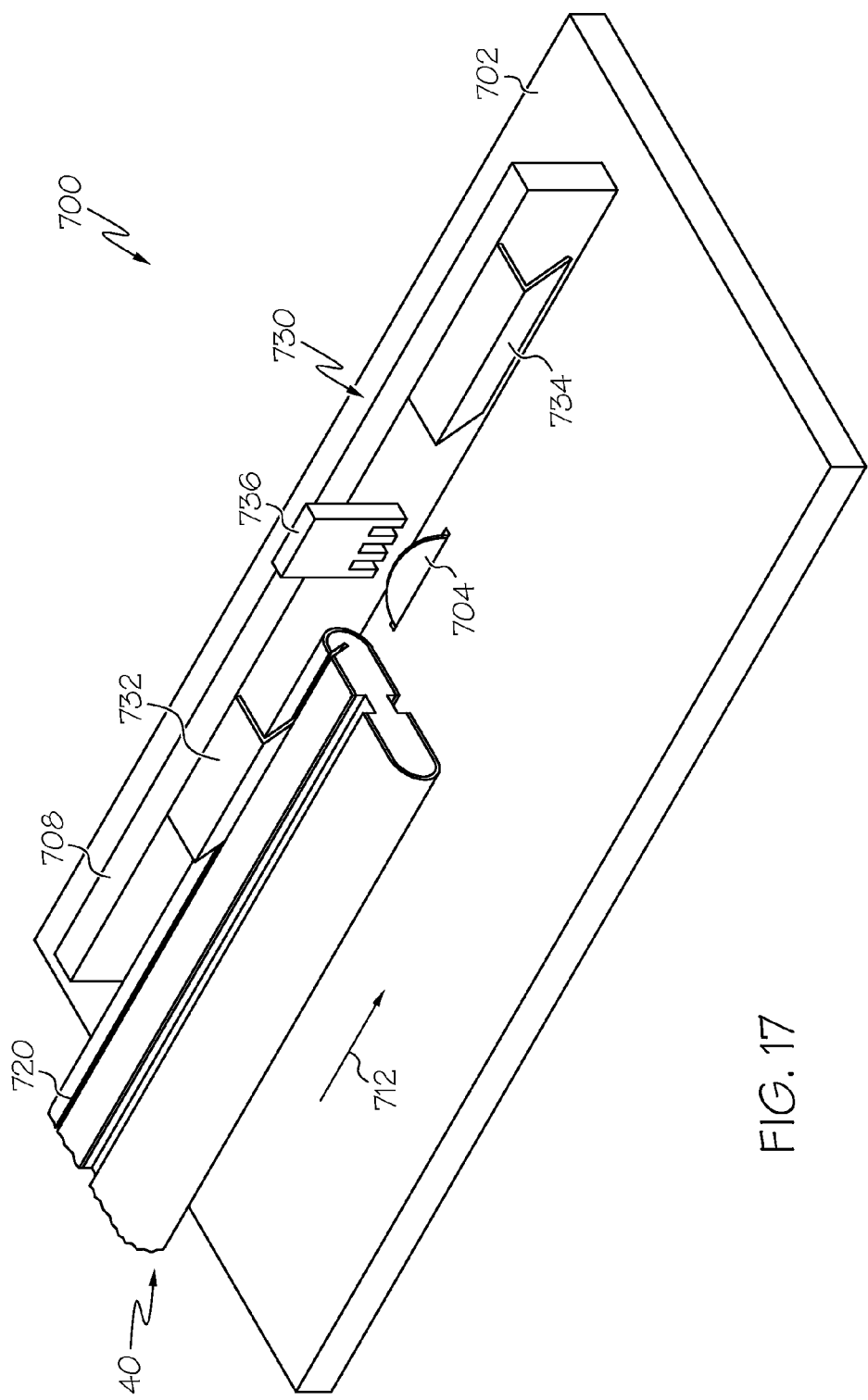
FIG. 17 schematically depicts a front perspective view of a cutting station according to one or more embodiments shown or described herein.

Subsequent to the formation of the first channel 720, the substrate/laminate assembly 40 is again introduced to the cutting station 700, as depicted in FIG. 17. In the depicted embodiment, the cutting station 700 includes the table saw 702 having the table 704, the blade 706 extending through the opening in the table 704, and a guide assembly 730. In the depicted embodiment, the guide assembly 730 is coupled to the table 704 and includes a first guide member 732 positioned upstream from the blade 706 in the feed direction 712 of the substrate/laminate assembly 40 and a second guide member 734 positioned downstream from the blade 706 in the feed direction 712 of the substrate/laminate assembly 40. The guide assembly 730 also includes a featherboard 736 positioned between the first guide member 732 and the second guide member 734. The cutting station 700 may also include a fence 708 spaced apart from the first and second guide members 732, 734.

Still referring to FIG. 17, the substrate/laminate assembly 40 having the first channel 720 is introduced to the cutting station 700 having the guide assembly 730. The substrate/laminate assembly 40 is positioned along the table 704 of the cutting station 700 such that the first guide member 732 of the guide assembly 730 is positioned within the first channel 720. The first guide member 732 thereby positions the substrate/laminate assembly 40 relative to the blade 706 by contacting the first channel 720 of the substrate/laminate assembly 40. The substrate/laminate assembly 40 is fed through the cutting station 700 such that the blade 706 cuts a second channel 724 into the substrate/laminate assembly 40. After the substrate/laminate assembly 40 is fed beyond the blade 706, the second guide member 734 may be positioned within the first channel 720, thereby limiting movement of the substrate/laminate assembly 40 relative to the blade 706 in a direction transverse to the feed direction 712 of the substrate/laminate assembly 40. The featherboard 736 may limit movement of the substrate/laminate assembly 40 in a direction normal to the table 704.

Figure 18:
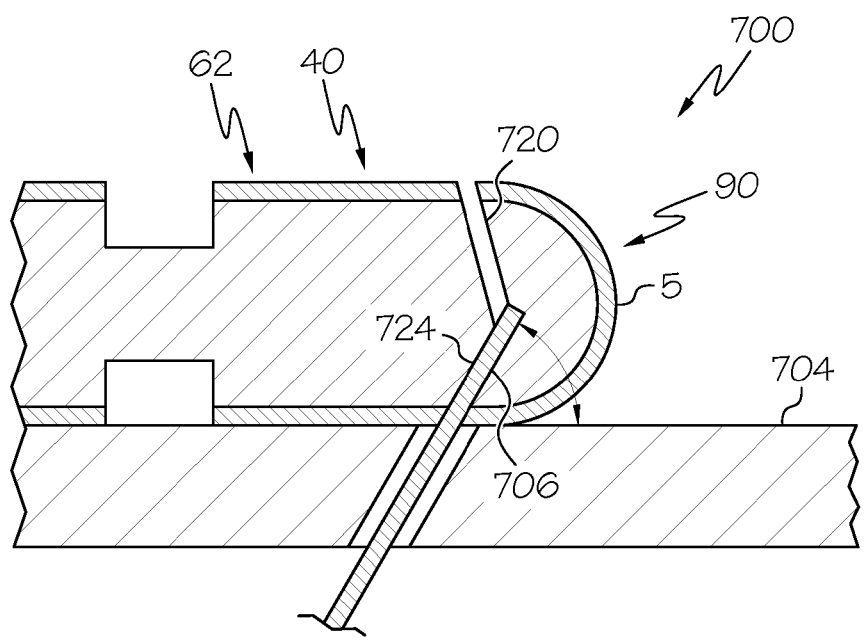
FIG. 18 schematically depicts a front cross-sectional view of the cutting station of FIG. 17 shown along line D-D.
Figure 19:
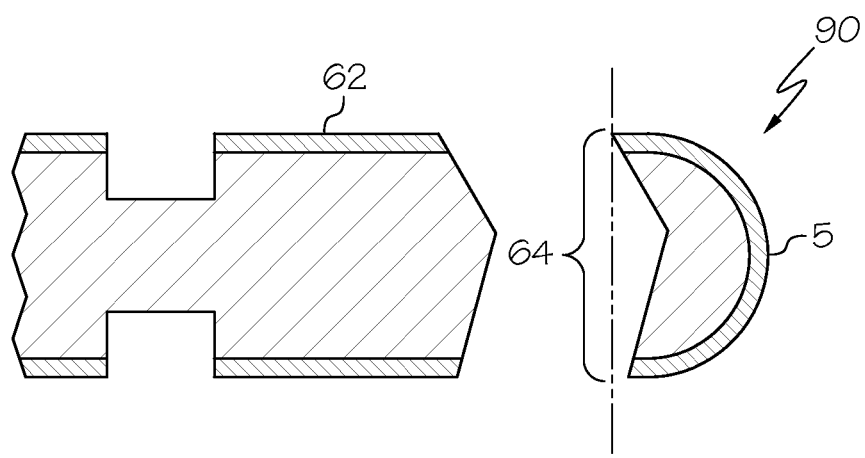
FIG. 19 schematically depicts a front cross-sectional view of a laminate/substrate assembly separated into a counter top edge and scrap according to one or more embodiments shown or described herein.

Referring now to FIGS. 18-19, the second channel 724 is positioned at an angle relative to the planar surfaces of the substrate/laminate assembly 40 that is in a range from about 85.5 degrees to about 89.5 degrees. The second channel 724 extends a depth into the substrate/laminate assembly 40 such that the second channel 724 intersects at least a portion of the first channel 720, thereby separating the counter top edge 90 from the scrap 62. Cutting the first channel 720 and the second channel 724 at an angle relative to the planar surfaces of the substrate/laminate assembly 40 creates a recess 64 in the counter top edge 90 opposite the formed laminate spine 5. When installing the counter top edge 90 onto a planar counter top (not shown), adhesive may be incorporated into the recess 64. Adhesive positioned within the recess 64 may allow for the counter top edge 90 to be reliably secured to the planar counter top while minimizing inaccuracies in fit between the counter top edge 90 and the planar counter top.

Cutting the first channel 720 and the second channel 724 at an angle relative to the planar surfaces of the substrate/laminate assembly 40 may also reduce the exposure of underlying layers of the laminate when the counter top edge 90 is installed onto the planar counter top. Cutting the first channel 720 and the second channel 724 at an angle minimizes the distances between adjacent laminate components. Reducing the exposure of the underlying layers of the laminate may be aesthetically pleasing to consumers.

The first channel 720 and the second channel 724 are generally positioned proximate to the tangential transition between the formed laminate upper leg 6 and the formed laminate spine 5 and the tangential transition between the formed laminate lower leg 7 and the formed laminate spine 5 of the substrate/laminate assembly 40. Cutting the first channel 720 and the second channel 724 at these positions may reduce exposure of the underlying portions of the laminate material.

Figure 20:
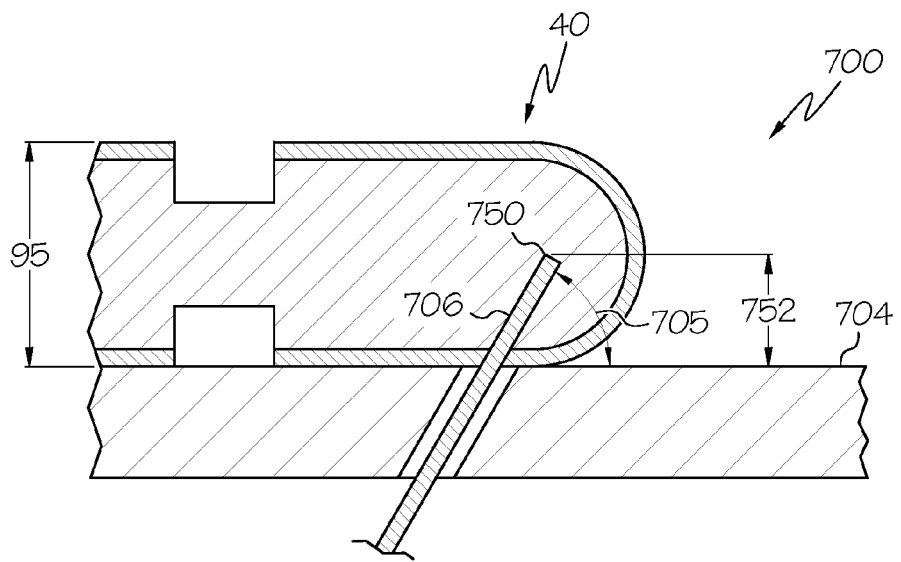
FIG. 20 schematically depicts a front cross-sectional view of a cutting station according to one or more embodiments shown or described herein.
Figure 21:
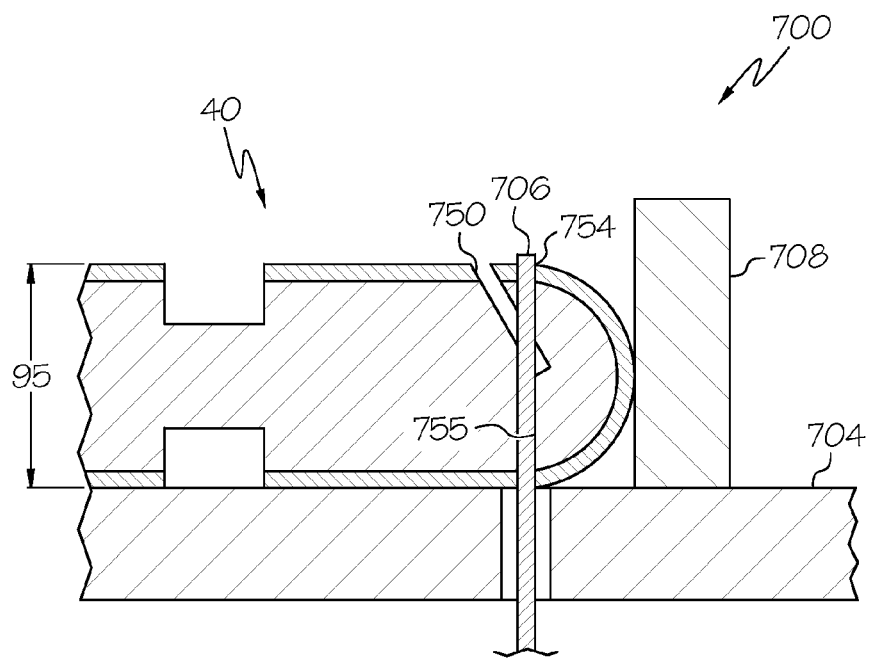
FIG. 21 schematically depicts a front cross-sectional view of a cuttings station according to one or more embodiments shown or described herein.

Referring now to FIGS. 20-21, another embodiment of the cutting station 700 used to separate the substrate/laminate assembly 40 into counter top edges 90 and scrap 62 is depicted. Referring to FIG. 20, the substrate/laminate assembly 40 is introduced to the cutting station 700 similar to the embodiment depicted in FIGS. 15-19. In the embodiment depicted in FIG. 20, the blade 70 is positioned transverse to the table 704 and biased at an angle relative to the table 704 in a range from about 75 degrees to about 85 degrees, including being biased at an angle relative to the table 704 of about 80 degrees. The substrate/laminate assembly 40 is positioned to contact the table 704 and the fence 708, and the substrate/laminate assembly 40 is directed towards the blade 706. The blade 706 cuts a first channel 750 into the substrate/laminate assembly 40. The first channel 750 extends a distance 752 into the substrate/laminate assembly 40 in the thickness direction of the substrate/laminate assembly 40 that is less than the thickness 95 of the substrate/laminate assembly 40, and at an angle relative to the planar surfaces of the substrate/laminate assembly 40 that is in a range from about 75 degrees to about 85 degrees.

Subsequent to the formation of the first channel 750, the substrate/laminate assembly 40 is again introduced to the cutting station 700, as depicted in FIG. 21. In this embodiment, the blade 706 extends through the opening in the table 704 at an orientation that is transverse to the table 704 and generally normal to the table 704. The substrate/laminate assembly 40 is positioned to contact the table 704 and the fence 708 (or alternatively or in addition, the guide assembly 730 depicted in FIG. 17). The substrate/laminate assembly 40 is directed towards the blade 706. The blade 706 extends from the table 704 a distance greater than the thickness 95 of the substrate/laminate assembly 40 such that the blade 706 introduces a through-cut 754 that passes through the thickness 95 of the substrate/laminate assembly 40. The through-cut 754 thereby separates the substrate/laminate assembly 40 into the counter top edge 90 and scrap 62. The through-cut 754 also forms an adhesion face 755 into the counter top edge 90 that is generally normal to the planar surface of the counter top edge 90.

The fence 708 is positioned relative to the blade 706 such that at least a portion of the first channel 750 cut into the substrate/laminate assembly 40 remains in the counter top edge 90 following formation of the through-cut 754. As depicted in FIG. 21, the portion of first channel 750 is positioned to extend through the adhesion face 755, such that the adhesion face 755 is non-continuous across the thickness 95 of the counter top edge 90. When the counter top edge 90 is secured to a generally planar countertop, excess adhesive positioned along the adhesion face 755 may flow into the first channel 750. Adhesive positioned within the first channel 750 may increase the bond strength between the generally planar countertop and the counter top edge 90. Allowing the adhesive to flow into the first channel 750 may also reduce the volume of adhesive that is displaced from the interface between the generally planar countertop and the counter top edge 90, which may reduce removal of excess adhesive.

Figure 22:
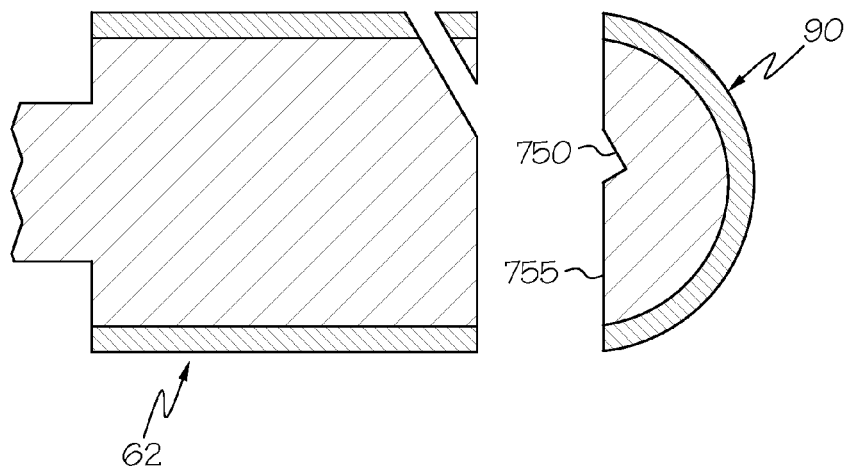
FIG. 22 schematically depicts a front cross-sectional view of a laminate/substrate assembly separated into a counter top edge and scrap according to one or more embodiments shown or described herein.
Figure 23:
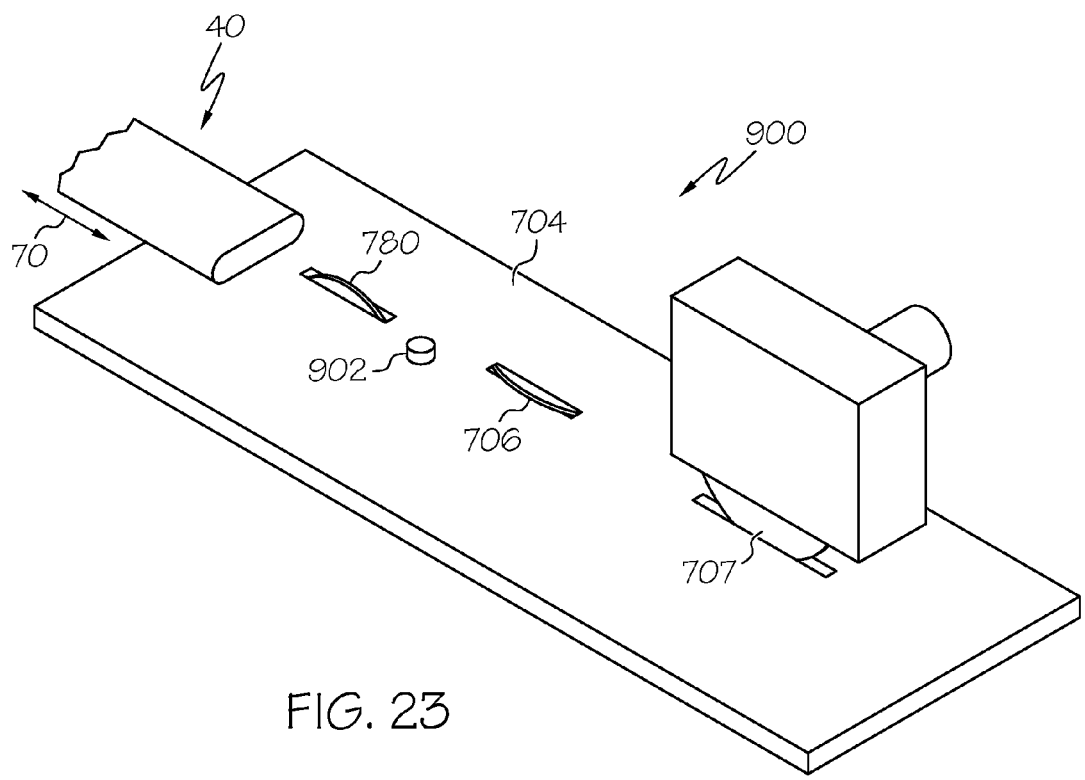
FIG. 23 schematically depicts a front perspective view of an integrated cutting station according to one or more embodiments shown or described herein.

While specific mention has been made herein to methods and apparatuses for producing counter top edges from substrate/laminate assemblies, it should be understood that a variety of cutting apparatuses and associated methods may be used without departing from the scope of the present disclosure. In one embodiment depicted in FIG. 22 an intermediate trim station 610, as depicted in FIGS. 13-14, and a cutting station 700, as depicted in FIGS. 20-21, may be incorporated into a single, integrated station 900, such that the formation of the first relief channel 620, the first channel 750, and the through-cut 754 may be performed in one continuous operation. Using such an integrated station 900 may decrease setup time as compared to the intermediate trim station 610 and the cutting station 700 and may reduce variation in the counter top edges 90.

In one embodiment, the integrated station 900 may incorporate a dado blade 780 that cuts the first channel 720 into the substrate/laminate assembly 40. The integrated station 900 may incorporate a guide 902 extending from the table 704 that is offset from the blades 706, 707 in a direction transverse to the longitudinal direction 70. The guide 902 is adapted to slide into the first channel 720 such that the guide 902 maintains at least partial contact with the first channel 720 as the substrate/laminate assembly 40 is directed towards the blades 706, 707.

In the depicted embodiment, the integrated station 900 includes a first blade 706 and a second blade 707 spaced apart from one another in the longitudinal direction 70. The first blade 706 and the second blade 707 are oriented transverse to the table 704. In the depicted embodiment (similar to the embodiment depicted in FIG. 20), the first blade 706 is positioned at an angle relative to the table 704 in a range from about 75 degrees to about 85 degrees, including being at an angle of about 80 degrees from the table 704. The first blade 706 cuts the first channel 720 into the substrate/laminate assembly 40. The first channel 750 extends a distance 752 into the substrate/laminate assembly 40 in the thickness direction of the substrate/laminate assembly 40 that is less than the thickness 95 of the substrate/laminate assembly 40, and at an angle relative to the planar surfaces of the substrate/laminate assembly 40 that is in a range from about 75 degrees to about 85 degrees.

As the substrate/laminate assembly 40 is directed along the integrated station 900 towards the second blade 707. In the depicted embodiment (similar to the embodiment depicted in FIG. 20), the second blade 707 is positioned above the table 704 and extends toward the table 704 at an orientation that is transverse to the table 704. In the depicted embodiment, the second blade 707 extends through an opening located on the table 704. In the depicted embodiment, the second blade 707 is oriented to be generally normal to the table 704. The substrate/laminate assembly 40 is directed towards the second blade 707. The second blade 707 introduces a through-cut 754 that passes through the thickness 95 of the substrate/laminate assembly 40. The through-cut 754 thereby separates the substrate/laminate assembly 40 into the counter top edge 90 and scrap 62. The through-cut 754 also forms an adhesion face 755 into the counter top edge 90 that is generally normal to the planar surface of the counter top edge 90. The fence 708 and/or the guide 902 is positioned relative to the blade 706 such that at least a portion of the first channel 750 cut into the substrate/laminate assembly 40 remains in the counter top edge 90 following formation of the through-cut 754.

Referring now to FIG. 24 another embodiment of a clamping press apparatus 800 is depicted. In this embodiment, the clamping press apparatus 800 includes a vacuum bag 802 that is in fluid communication with a vacuum pump 804. After the laminate is heated and formed on the post form mold and the formed laminate is positioned around the substrate sandwiching adhesive, as described hereinabove, the formed laminate 4 and the substrate 30 are positioned within the vacuum bag 802. A fluid-tight seal is engaged to seal the vacuum bag 802 and the vacuum pump evacuates air from the interior of the vacuum bag 802. External pressure, for example atmospheric pressure, is applied to the exterior surface of the vacuum bag 802, which is transferred to the formed laminate 4. The external pressure applied to the vacuum bag 802, therefore, maintains a clamping force between the formed laminate 4 and the substrate upper face 36, the substrate lower face 38, and the substrate shaped edge 32 of the substrate 30. The vacuum pump 804 may maintain a vacuum in the vacuum bag 802 for a pre-determined time, selected such that the adhesive between the formed laminate 4 and the substrate 30 has an opportunity to at least partially cure.

In some embodiments, the vacuum bag 802 containing the formed laminate 4 and the substrate 30 may be introduced to an elevated temperature region, for example, by positioning the vacuum bag 802 in an oven. In some embodiments, a plurality of formed laminates 4 and a plurality of substrates 30 may be positioned within the vacuum bag 802 such that a batch of substrate/laminate assemblies 40 may be clamped and cured simultaneously.

While discussion above has included recitation of "upper" and "lower," it should be understood that these terms relate relative positioning of components of the apparatuses described herein. Repositioning of components relative to one another may not affect performance of the methods or operation of the apparatuses described herein. Accordingly, such terms may be used interchangeably herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of manufacturing a shaped counter top edge comprising:
heating a sheet laminate to an elevated temperature;
bending the sheet laminate to a formed laminate;
applying adhesive to at least one of the formed laminate or a substrate comprising a substrate upper face, a substrate lower face, and a substrate shaped edge positioned between the substrate upper face and the substrate lower face;
positioning the formed laminate proximate to the substrate upper face, the substrate lower face, and the substrate shaped edge;
clamping the formed laminate to the substrate upper face, the substrate lower face, and the substrate shaped edge of the substrate with a clamping press assembly until the adhesive cures to form a substrate/laminate assembly from the formed laminate and the substrate, wherein the clamping press assembly comprises:
a bonding press comprising:
a clamping insert comprising a bonding press mold groove; and
a reinforcement member coupled to the clamping insert, the reinforcement member comprising a web portion, a first flange portion extending from the web portion, and a second flange portion extending from the web portion, the first and second flange resist deformation of the clamping insert in a direction that tends to open the bonding press mold groove; and
a bonding fixture comprising at least one force application member coupled to a support frame, the force application member selectively applying a clamping force to the reinforcement member of the bonding press; and
cutting a portion of the substrate/laminate assembly to form the shaped counter top edge.

2. The method of claim 1, further comprising forming the sheet laminate around a post form mold of a post form molding machine.

3. The method of claim 1, wherein the clamping press assembly applies a force to the laminate in a direction normal to the substrate.

4. The method of claim 1, wherein the at least one force application member comprises a hydraulic clamp in fluid communication with a hydraulic pressure source at an elevated pressure.

5. The method of claim 1, further comprising heating the formed laminate, the adhesive, and the substrate to decrease a cure time of the adhesive.

6. The method of claim 1, further comprising machining a first relief channel into the laminate and the substrate along a first side of the substrate and a second relief channel into the laminate and the substrate along a second side of the substrate opposite the substrate shaped edge from the first side of the substrate.

7. The method of claim 1, wherein cutting a portion of the laminate and the substrate from the substrate/laminate assembly comprises:
cutting a first channel through the laminate and into a portion of the substrate in a longitudinal direction along a length of the substrate; and
cutting a second channel through the laminate and into a portion of the substrate in the longitudinal direction along the length of the substrate.

8. The method of claim 7, wherein the first channel and the second channel are transverse with one another.

9. The method of claim 7, further comprising introducing a first guide member into the first channel of the substrate/laminate assembly during cutting of the second channel.

10. The method of claim 9, wherein during cutting of the second channel, the first guide member is positioned at an angle relative to a blade cutting the second channel.

11. The method of claim 10, wherein the first guide member is positioned at an angle relative to a fence extending transverse to a table.

12. The method of claim 10, wherein a featherboard applies a force to the substrate/laminate assembly in a direction parallel to a fence extending transverse to a table.

13. The method of claim 10, further comprising contacting at least one of a cut face of the first channel of the substrate/laminate assembly with a second guide member positioned spaced apart from the first guide member in the feed direction.

14. A method of manufacturing a shaped counter top edge comprising:
heating a sheet laminate to an elevated temperature;
bending the sheet laminate to a formed laminate;
applying adhesive to at least one of the formed laminate or a substrate comprising a substrate upper face, a substrate lower face, and a substrate shaped edge positioned between the substrate upper face and the substrate lower face;
positioning the formed laminate proximate to the substrate upper face, the substrate lower face, and the substrate shaped edge;
clamping the formed laminate to the substrate upper face, the substrate lower face, and the substrate shaped edge of the substrate with a clamping press assembly until the adhesive cures to form a substrate/laminate assembly from the formed laminate and the substrate;
machining a first relief channel into the laminate and the substrate along a first side of the substrate and a second relief channel into the laminate and the substrate along a second side of the substrate opposite the substrate shaped edge from the first side of the substrate; and
cutting a portion of the substrate/laminate assembly to form the shaped counter top edge.

15. The method of claim 14, further comprising forming the sheet laminate around a post form mold of a post form molding machine.

16. The method of claim 14, wherein the clamping press assembly applies a force to the laminate in a direction normal to the substrate.

17. The method of claim 14, wherein the clamping press assembly comprises:
a bonding press comprising:
a clamping insert comprising a bonding press mold groove; and
a reinforcement member coupled to the clamping insert, the reinforcement member comprising a web portion, a first flange portion extending from the web portion, and a second flange portion extending from the web portion, the first and second flange resist deformation of the clamping insert in a direction that tends to open the bonding press mold groove; and
a bonding fixture comprising at least one force application member coupled to a support frame, the force application member selectively applying a clamping force to the reinforcement member of the bonding press.

18. The method of claim 17, wherein the at least one force application member comprises a hydraulic clamp in fluid communication with a hydraulic pressure source at an elevated pressure.

19. The method of claim 14, further comprising heating the formed laminate, the adhesive, and the substrate to decrease a cure time of the adhesive.

20. The method of claim 14, wherein cutting a portion of the laminate and the substrate from the substrate/laminate assembly comprises:
   cutting a first channel through the laminate and into a portion of the substrate in a longitudinal direction along a length of the substrate; and
   cutting a second channel through the laminate and into a portion of the substrate in the longitudinal direction along the length of the substrate.

21. The method of claim 20, wherein the first channel and the second channel are transverse with one another.

22. The method of claim 20, further comprising introducing a first guide member into the first channel of the substrate/laminate assembly during cutting of the second channel.

23. The method of claim 22, wherein during cutting of the second channel, the first guide member is positioned at an angle relative to a blade cutting the second channel.

24. The method of claim 23, wherein a featherboard applies a force to the substrate/laminate assembly in a direction parallel to a fence extending transverse to a table.

25. The method of claim 23, further comprising contacting at least one of a cut face of the first channel of the substrate/laminate assembly with a second guide member positioned spaced apart from the first guide member in the feed direction.

\* \* \* \* \*